Nov. 18, 1941.    D. HERING    2,262,934
WELL SURVEYING METHOD
Filed June 10, 1939
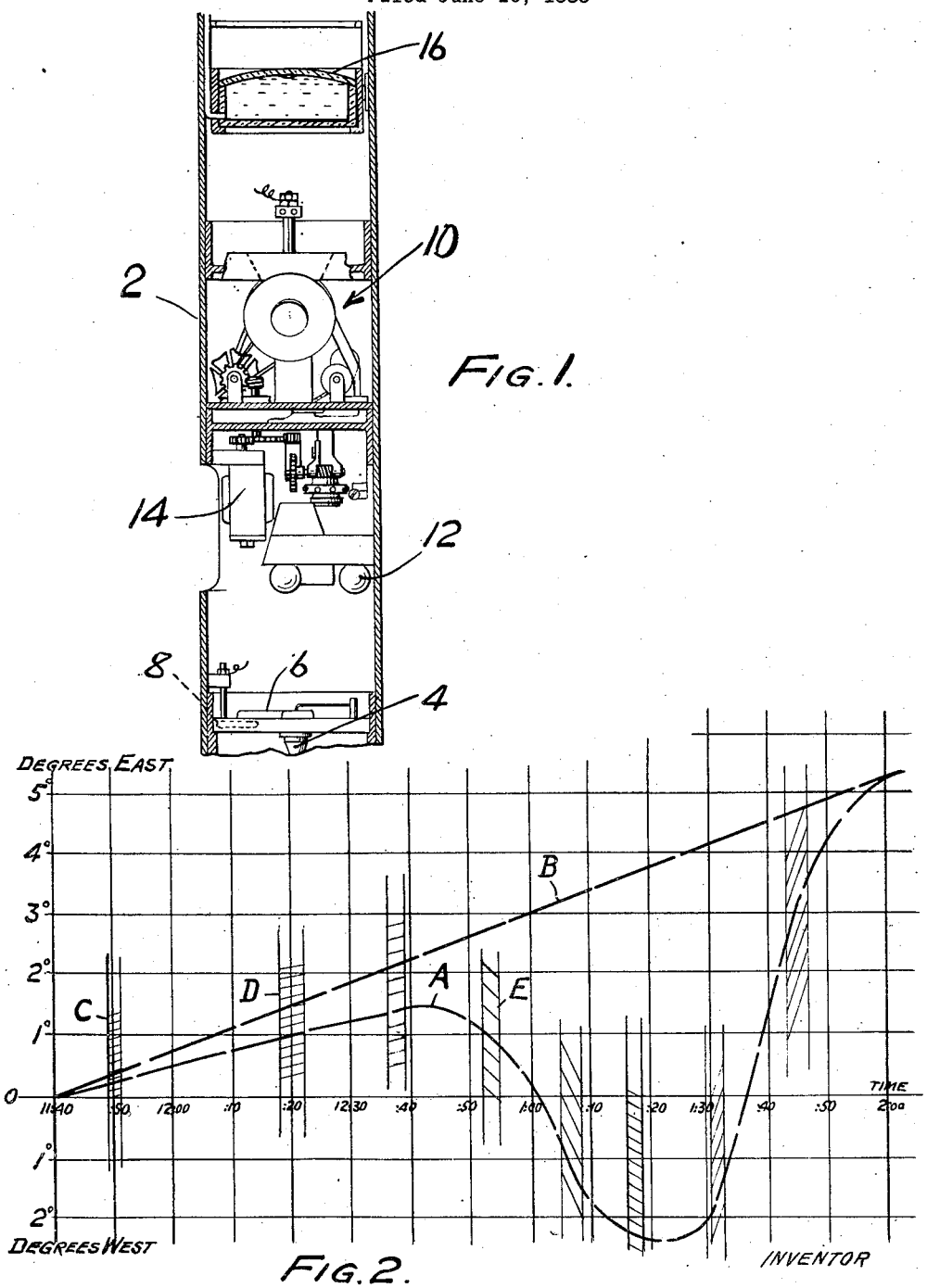

Patented Nov. 18, 1941

2,262,934

UNITED STATES PATENT OFFICE 2,262,934

WELL SURVEYING METHOD

Donald Hering, South Gate, Calif., assignor to Sperry-Sun Well Surveying Company, Philadelphia, Pa., a corporation of Delaware Application June 10, 1939, Serial No. 278,557

2 Claims. (Cl. 33—205.5)

This invention relates to a well surveying method and has particular reference to carrying out surveys of bore holes with a gyroscope type of instrument in such fashion as to make possible corrections for gyroscopic drift.

As is well known in the art relating to gyroscopes, a balanced freely supported gyroscope will only maintain a fixed position with respect to the earth if the axis of rotation is parallel with the axis of the earth. This is due to the property of rigidity of the gyroscope. If the gyroscope rotor is pointed in any other direction with respect to the earth, this property of rigidity will cause it to maintain its axis fixed in space, and consequently, as rotation of the earth occurs, its axis will rotate relatively to the earth. In an instrument such as a well surveying instrument, it is not generally feasible to cause the axis of rotation of a gyroscope to assume parallelism with the earth's axis, not only because the instrument is used in widely different localities, but because limitations of space and the fact that a bore hole to be surveyed has an unknown course require that the axis of the gyroscope be originally substantially horizontal when the instrument is vertical, so that it may have a limited freedom to tilt irrespective of the course the bore hole may take. It is generally not feasible to provide for 360° rotation about both gimbal axes.

Accordingly, there is used rather than a true gyroscope what is known as a gyroscopic directional indicator. By the application of a torque tending to move a supporting gimbal about its horizontal axis a precession may be applied to the gimbal rotating about a vertical axis which will be equal and opposite the rotation relative to the earth which would occur due to the earth's rotation. Thus the axis of the gyroscope rotor may be caused to maintain a north and south direction with respect to the earth.

While the unbalancing of the apparatus can be attained with a considerable degree of accuracy, it will be evident that it is practically impossible to completely effect the balancing of the opposing motion so that there would not occur precession relative to the earth over a long period of time.

Furthermore, any application of torque to a gimbal axis will cause precession to occur. Such torque may arise from many causes. For instance, if there is a sudden change in the course of a bore hole caused by a sudden increase in its angle of inclination, and if the horizontal axis of the gyroscope happened to be in the vertical plane of this change of inclination, a greater friction may occur in one of the bearings which receives a greater weight to support due to this inclination of the axis. The friction thus produced may cause precession and the gyroscope pointer will indicate a drift. Likewise, precession may be caused if while lowering the instrument the lowering movement is suddenly arrested or if the casing is moved laterally by hitting an obstruction. Such occurrences may change the direction of the drift as well as its rate. Additionally, precession forces may arise due to variations in speed of the rotor, for example, with reduction of battery voltage due to battery exhaustion or polarization.

In a well constructed gyroscope, the drift occasioned by the above mentioned factors will be slight, even though the casing of a well surveying instrument containing the gyroscope may tend to spin on its supporting cable and will be subjected to various inclinations on its path through a bore hole. Experience has shown that in such a gyroscope drift does not occur erratically or suddenly, but is gradual and uniform through extended periods, though, for example, in a survey extending over a considerable period of time, the drift may vary in magnitude and even in direction.

In accordance with the present invention, a survey made with a gyroscopic type of instrument may be made in such fashion that drift indications may be ascertained and applied to correct the results of the survey. It has been found by experience that the corrections obtained in accordance with the invention lead to extremely close checking of inward and outward runs of a well surveying instrument or successive runs in the same hole, so that the assumption of slowly changing drift on which the method is based appears thoroughly justified.

The method forming the subject-matter of the invention will be best appreciated from the following description, read in conjunction with the accompanying drawing, in which:

Figure 1 is a diagrammatic sectional view illustrating the essential elements of a gyroscopic well surveying instrument used in carrying out the improved method; and Figure 2 is a graph illustrating the nature of the corrections ascertained from the practice of the method and their use.

In Figure 1 there are illustrated the essential elements of a well surveying instrument of well known type which is described in detail in the patent to Williston and Nichols 1,960,038, dated May 22, 1934. The type of gyroscope used in this instrument is further illustrated in Sperry patent 1,959,141, dated May 15, 1934.

The instrument illustrated in the above patents comprises an outer protective casing in which is located an inner casing 2 carrying recording apparatus. The apparatus includes a gyroscope indicated at 4, a vertical gimbal ring of which has connected to it a pointer 6 moving adjacent a suitable scale. Located also adjacent this scale is a timepiece in the form of a watch, indicated at 8. A record of the position of the pointer 6 and of the time indicated by the watch is made photographically by means of a camera 10, the pointer scale and watch being illuminated by lamps 12. The camera 10 is of a type to produce a series of records at short intervals under control of a motor 14 which intermittently advances the film and produces successive exposures by illumination of the lamps. Simultaneously an upper lens system produces on the same film a record of inclination by projecting on the film an image of the bubble in a level 16 illuminated by an upper lamp (not shown). This instrument is described in detail in the patents referred to above. In the type of operation used heretofore, the instrument is run through a bore hole with the camera operating and records at the surface are made correlating depth and time through the use of a timepiece synchronized with that indicated at 8 which is photographed in the instrument. From the records thus obtained, the inclination and direction of inclination of the hole may be ascertained at various depths, the time constituting a parameter which is finally eliminated to secure the path of the bore hole as a function of depth.

In the operation of the instrument heretofore, it was customary to make readings both while the instrument was running into the hole and while it was being withdrawn from the hole. In this fashion two independent records of the path of the hole would be obtained and the degree of validity of results could be ascertained by determining how well these two records checked each other. If the check was good, i. e., if both indicated the bottom of the hole to be at about the same position, and if observation of the gyroscope at the end of the run indicated that its drift was negligible, it would be obvious that the survey was a valid one.

Frequently, however, it was found that an appreciable amount of drift of the gyroscope had occurred. In such case, a correction of the results with an assumption of uniform drift might produce a satisfactory check of the in and out runs, and it could obviously then be assumed that the survey was valid with such correction.

Occasionally, however, it was found that such assumption of uniform drift of the gyroscope might lead to considerable discrepancy between the results of the in and out runs, and it might thus be deduced that the gyroscopic drift was not uniform and that no proper correction could be made on the basis of such assumption. In the practice of the method of the present invention it has been found that usually the in and out runs check each other to a surprising degree, in fact, almost always for within the limits of permissible deviations from accuracy.

Briefly stated, the improved method comprises imparting to the instrument movements during spaced periods with interspersed periods of rest during which at least two records of the position of the gyroscope and of time are made. These periods of rest are provided at spaced intervals, such, for example, as intervals of 10 to 20 minutes and may be of durations of, say, about 5 minutes. The various records obtained during such periods of rest which are, of course, noted at the surface, will give the rates of drift of the gyroscope during these periods. At the end of the run the total drift should be noted. It is also advisable to have check periods occur immediately after making up the protective casing and again immediately prior to opening up the protective casing to give additional checks on the drift.

Reference to Figure 2 will indicate the graphical use made of the data so obtained to correct the readings during the survey.

In Figure 2 the east and west deviations in degrees are plotted against time. Assume, for example, that the survey was begun at 11:40 a. m. and was finished at 2:00 p. m. The gyroscopic pointer would be first aligned so as to point directly north.

Assume during the run that at about 11:50 the first rest period occurred, lasting, for example, about 3 minutes. From the records made of the time and gyroscopic pointer during this interval, the rate of drift might be ascertained. This can be indicated, as indicated on the graph at C, by the sloping lines, the slope in this case being upwardly to the right indicating an eastward drift. For the purpose of graphic construction, a number of these lines having the proper slope indicative of the drift may be drawn as indicated.

Similarly, at the next rest period occurring in the graph at 12:20 another series of lines D are drawn indicating the rate of drift. This is repeated at suitable time intervals as indicated. In the graph it will be noted that shortly after 12:50 the drift became a drift toward the west (indicated at E) ultimately becoming a relatively large eastward drift toward the end of the run.

If it is assumed that the drift curve plotted against time is a relatively smooth one without sharp changes in direction, it will be obvious that the tangents to such a drift curve should, at the various rest times, be parallel to the drifts indicated during the periods of rest. A curve may then be drawn, as indicated, giving the actual drift during the entire period of the run. From the total drift noted at the end of the run the end point this curve should have will be known and hence a better curve may be drawn than might be secured taking into account the slopes alone. This curve is indicated on the graph at A. The straight line indicated at B would represent the average drift over the entire time, which, it will be observed, will not tell the true story of the drifts which occurred and which may lead to substantial error in the interpretation of the results.

By correcting the records obtained during a survey in accordance with a smooth drift curve of the type indicated in Figure 2, thus taking into consideration the relative position of the gyroscope pointer with respect to its original position, a corrected record of the course of a bore hole may be determined. The corrections may be made either before or after the translation of time to depth.

As indicated above, the check of surveys made, particularly during in and out runs of gyroscopic instruments, have indicated the validity of the assumption of a smooth drift correction curve as indicated above.

What I claim and desire to protect by Letters Patent is:

1. The method of determining the path of a bore hole through the use of a well surveying instrument which comprises a casing containing a gyroscope including supporting said instrument on a wire line and through said line imparting to said instrument movements lengthwise of the bore hole during spaced periods with intermediate periods of rest of said instrument, producing in each period of rest and of movement a plurality of records of the position of the gyroscope relative to the casing, and determining from the records made during periods of rest the rate of drift of the gyroscope and thus the drift corrections to be applied to the records secured during periods of movement.

2. The method of determining the path of a bore hole through the use of a well surveying instrument which comprises a casing containing a gyroscope including supporting said instrument on a wire line and through said line imparting to said instrument movements lengthwise of the bore hole during spaced periods with intermediate periods of rest of said instrument, producing in each period of rest and of movement a plurality of records of the position of the gyroscope relative to the casing, and of the time when each such record of position is made, and determining from the records made during periods of rest the rate of drift of the gyroscope and thus the drift corrections to be applied to the records secured during periods of movement.

DONALD HERING.